US012695630B2

(12) United States Patent
Perrine et al.

(10) Patent No.: US 12,695,630 B2
(45) Date of Patent: Jul. 28, 2026

(54) METHOD FOR REMOTELY PROGRAMMING A PROGRAMMABLE DEVICE

(71) Applicant: Nagravision Sàrl, Cheseaux-sur-Lausanne (CH)

(72) Inventors: Jerome Perrine, Cheseaux-sur-Lausanne (CH); Karine Villegas, Cheseaux-sur-Lausanne (CH); Didier Hunacek, Cheseaux-sur-Lausanne (CH); André Nicoulin, Cheseaux-sur-Lausanne (CH); Richard Roulleau, Cheseaux-sur-Lausanne (CH)

(73) Assignee: NAGRAVISION SARL, Cheseaux-sur-Lausanne (CH)

( * ) Notice: Subject to any disclaimer, the term of this patent is extended or adjusted under 35 U.S.C. 154(b) by 307 days.

(21) Appl. No.: 18/004,416

(22) PCT Filed: Jul. 6, 2021

(86) PCT No.: PCT/EP2021/068605
§ 371 (c)(1),
(2) Date: Jan. 5, 2023

(87) PCT Pub. No.: WO2022/008487
PCT Pub. Date: Jan. 13, 2022

(65) Prior Publication Data
US 2023/0224173 A1      Jul. 13, 2023

(30) Foreign Application Priority Data
Jul. 6, 2020      (EP) ...................................... 20184290

(51) Int. Cl.
*H04L 9/32*          (2006.01)
*G06F 21/75*        (2013.01)

(52) U.S. Cl.
CPC ............ *H04L 9/3278* (2013.01); *G06F 21/75* (2013.01)

(58) Field of Classification Search
CPC ..... H04L 9/3278; H04L 9/0866; H04L 63/06; H04L 9/32; G06F 21/75; G06F 21/76; H04W 12/04
See application file for complete search history.

(56) References Cited

U.S. PATENT DOCUMENTS 8,918,647 B1      12/2014   Wallrabenstein
11,538,106 B2 *   12/2022   Raleigh ................... H04W 4/24
(Continued)

FOREIGN PATENT DOCUMENTS

KR          101079565  B1      11/2011

OTHER PUBLICATIONS

International Search Report issued Oct. 12, 2021 in PCT/EP2021/068605 filed on Jul. 6, 2021, 4 pages.
(Continued)

*Primary Examiner* — Quazi Farooqui
(74) *Attorney, Agent, or Firm* — POLSINELLI LLP

(57)          ABSTRACT

A method for remotely programming a programmable device designed to provide an expected sensitive result. The method including transmitting a first program code to the programmable device, the first program code being configured to get at least one distinctive data unique and physically inherent to the programmable device, retrieving the distinctive data, and transmitting a second program code based on the retrieved distinctive data to the programmable device, so as to load the second program code into the programmable device.

18 Claims, 3 Drawing Sheets

(56) References Cited

U.S. PATENT DOCUMENTS

| | | | |
|---|---|---|---|
| 2004/0073654 A1* | 4/2004 | Sarma ................. | G06F 11/2294 |
| | | | 709/224 |
| 2011/0055851 A1* | 3/2011 | Potkonjak ............... | G09C 1/00 |
| | | | 719/318 |
| 2012/0102334 A1* | 4/2012 | O'Loughlin .......... | H04L 9/3252 |
| | | | 713/189 |
| 2014/0258736 A1 | 9/2014 | Merchan et al. | |
| 2015/0341792 A1* | 11/2015 | Walsh ................... | H04W 12/08 |
| | | | 713/176 |
| 2018/0131528 A1* | 5/2018 | Profumo ............... | H04L 9/0866 |
| 2018/0167391 A1* | 6/2018 | Lawson ................ | H04W 84/06 |
| 2019/0305927 A1 | 10/2019 | Bhunia et al. | |

OTHER PUBLICATIONS

Extended European Search Report & Written Opinion issued Oct. 23, 2020 In European Application 20184290.3 filed on Jul. 6, 2020, 8 pages.
Simpson et al., "Offline Hardware/Software Authentication for Reconfigurable Platforms", CHES 2006 Lecture Notes in Computer Science 4249; 2006, 14 pages.
Jin et al., "Security of Cloud FPGAs: A Survey", ACM Comput. Survey, ARXIV.ORG, May 2020, 32 pages.

\* cited by examiner

METHOD FOR REMOTELY PROGRAMMING A PROGRAMMABLE DEVICE

TECHNICAL FIELD

The present disclosure relates to the field of remote programmable devices, such as hardware designed to provide sensitive services or execute functions to be secured on a remote untrusted platform. To this end, this disclosure relates to a method for remotely programming a programmable device designed to provide expected sensitive result. It further relates to such a programmable device, as well as a provider for remotely providing program codes to such a programmable device.

BACKGROUND

Platforms in untrusted environment are prone to be spied, cloned or hacked to retrieve and exploit sensitive or valuable information. Within an environment based on a remote source of information, it is possible for a hacker to divert the communication with the remote source and pretend to be part of a trusted system in order to get access to such information or services.

The risk of having to deal with fraudulent actions may be also present during other operations, for example when upgrading software remotely on such programmable devices. Software can be subject to malicious attacks, such as reverse engineering attacks, undertaken by external parties for several purposes. Some attacks may seek to modify the software, e.g. to bypass certain features or to add therein a malicious code segment, to copy the software or to read it in order to understand how it works.

In an attempt to overcome such a concern, some devices are configured to generate an identifier using a so-called True Random Number Generator (TRNG), also known as Hardware Random Number Generator (HRNG). Such a generator is a device that generates a random number from a physical process instead of being merely based on an algorithm. The physical process used by such a generator is defined as being unpredictable given that it is based on microscopic phenomena that generate low-level signal. However, generating a number using a TRNG to provide a unique number is not enough efficient, because once the generated value is known, any hacker can clone the solution for replication purposes.

Document US 2019/305927 A1 discloses a bitstream security based on node locking. More specifically this document discloses an approach to FPGA (Field Programmable Gate Array) security providing protection against in-field bitstream reprogramming as well as an Intellectual Property (IP) piracy, while permitting wireless reconfiguration without encryption.

Document US 2014/258736 A1 discloses systems and methods for maintaining integrity and security in untrusted computing platforms. More specifically, the document discloses a method for generating a secret cryptographic key based on a physically unclonable function (PUF) in at least one hardware component of a trusted processor, then generating a first public key and first private key using the aforementioned secret cryptographic key, and executing instruction code corresponding to a first software program.

Document U.S. Pat. No. 8,918,647 B1 discloses an authentication system and more specifically relates to hardware verification and to binding authentication to protect against tampering and subversion by substitution.

Accordingly, there is a need for an efficient and reliable solution to prevent such threats and at least partially overcome the aforementioned issues and drawbacks. More specifically, such a solution should be able to at least protect the integrity and confidentiality of valuable services or information for which such programmable devices on remote platforms are designed. This solution should be further able to efficiently prevent replications of valuable related products or services and, if any, provide secure upgrades of remote platforms.

SUMMARY OF THE SOLUTION

To address this concern, the present disclosure suggests, as a first aspect, a method for remotely programming a programmable device designed to provide an expected sensitive result, as defined in claim 1.

In an embodiment, the method comprises:

transmitting a first program code to the programmable device, said first program code being configured to get at least one distinctive data unique and physically inherent to the programmable device, retrieving said distinctive data to generate a second program code configured to provide the expected sensitive result while the second program code is executed on the programmable device having produced the distinctive data, and transmitting said second program code to the programmable device, so as to load the second program code into the programmable device.

Thanks to the present solution, the functional state of the second program code can be altered, so that the second program code can only provide the expected sensitive result when it is run on a single and specific programmable device, namely a unique programmable device, more particularly on the device having produced the distinctive data after having executed the first program code. This means that, even if the second program code is made available to a third party for running it on a programmable device of a third party similar to that having produced the distinctive data, the result provided by this device would be different from the expected sensitive result. Therefore, the second program code is advantageously bound to a unique programmable device so that despite the fact that this device is physically located on a remote untrusted platform that may be subject to numerous malicious attacks, the result provided by this second program code remains efficiently protected against such attacks because the second program code would provide the expected sensitive result only if it is executed by this unique programmable device. Furthermore, the second program code may be altered in such a way that reverse engineering would be more difficult and its real design will be reconstituted only if it is executed on the specific programmable device.

Preferably, the first program code and the second program code are designed by a provider remotely linked to the programmable device via a communication channel.

According to one embodiment, the distinctive data results or is derived from a physically unclonable function (PUF) applied to at least one component of the programmable device.

In one embodiment, the second program code is transformed by an invertible function depending on the distinctive data. Preferably, the invertible function is a mathematical or logical function.

In another embodiment, the second program code is transformed by replacing at least one program code portion, retrievable from said distinctive data, by an altered portion.

According to one embodiment, the second program code is a global program code, common to a set of distinguishable programmable devices, configured to be personalized by means of a personal setting message for at least one programmable device of said set, said personal setting message being based on the distinctive data of the related programmable device.

Preferably, the related programmable device comprises a unique function configured to provide a first key from the personal setting message used as input data in said unique function, said first key being further used as input of the global program code for providing therefrom the expected sensitive result.

In one embodiment, the global program code is a cryptographic algorithm.

Preferably, the expected sensitive result is a second key, preferably an activation key or a cryptographic key.

In one embodiment, at least one of the transmitting and retrieving steps is secured by at least one of an authentication process and an encryption process.

In another embodiment, at least one of the first program code and the second program code is a netlist, a source code or a machine code.

Preferably, in the event that the communication channel is at least partly provided by a global network or by an untrusted communication channel, the first program code is transmitted to the programmable device in a secure manner so as to ensure authenticity and integrity of the first program code.

According to a second aspect, the present disclosure also relates to a programmable device designed to be remotely programmed in accordance with the above-mentioned method, which can be executed according to any of its embodiments or according to any possible combination of these embodiments, in order to provide an expected sensitive result. This programmable device is defined in the claims. In an embodiment, the programmable device comprises:

at least one distinctive data unique and physically inherent to the programmable device, a communication interface for receiving a first program code, configured to get said distinctive data, and a second program code, configured to provide the expected sensitive result on the basis of said distinctive data, at least one memory for storing said first and second program codes, and a processor or a hardware state machine for executing said first and second program codes.

In a third aspect, the present disclosure relates to a provider for remotely providing program codes to at least one programmable device in accordance with the above-mentioned method, which can be executed according to any of its embodiments or according to any possible combination of these embodiments. This provider is defined in the claims. In an embodiment, the provider comprises:

a program code generator for generating a first program code, configured to get at least one distinctive data unique and physically inherent to the programmable device, and a second program code, configured to provide an expected sensitive result on the basis of said distinctive data, and a communication interface configured to be connected to a communication channel for sending said first and second program codes to the programmable device and for receiving therefrom said distinctive data.

Other embodiments and advantages will be disclosed in the detailed description.

BRIEF DESCRIPTION OF THE DRAWINGS

The solution and the embodiments suggested in the present disclosure should be taken as non-limitative examples and will be better understood with reference to the attached figures in which.

DETAILED DESCRIPTION

Figure 1:
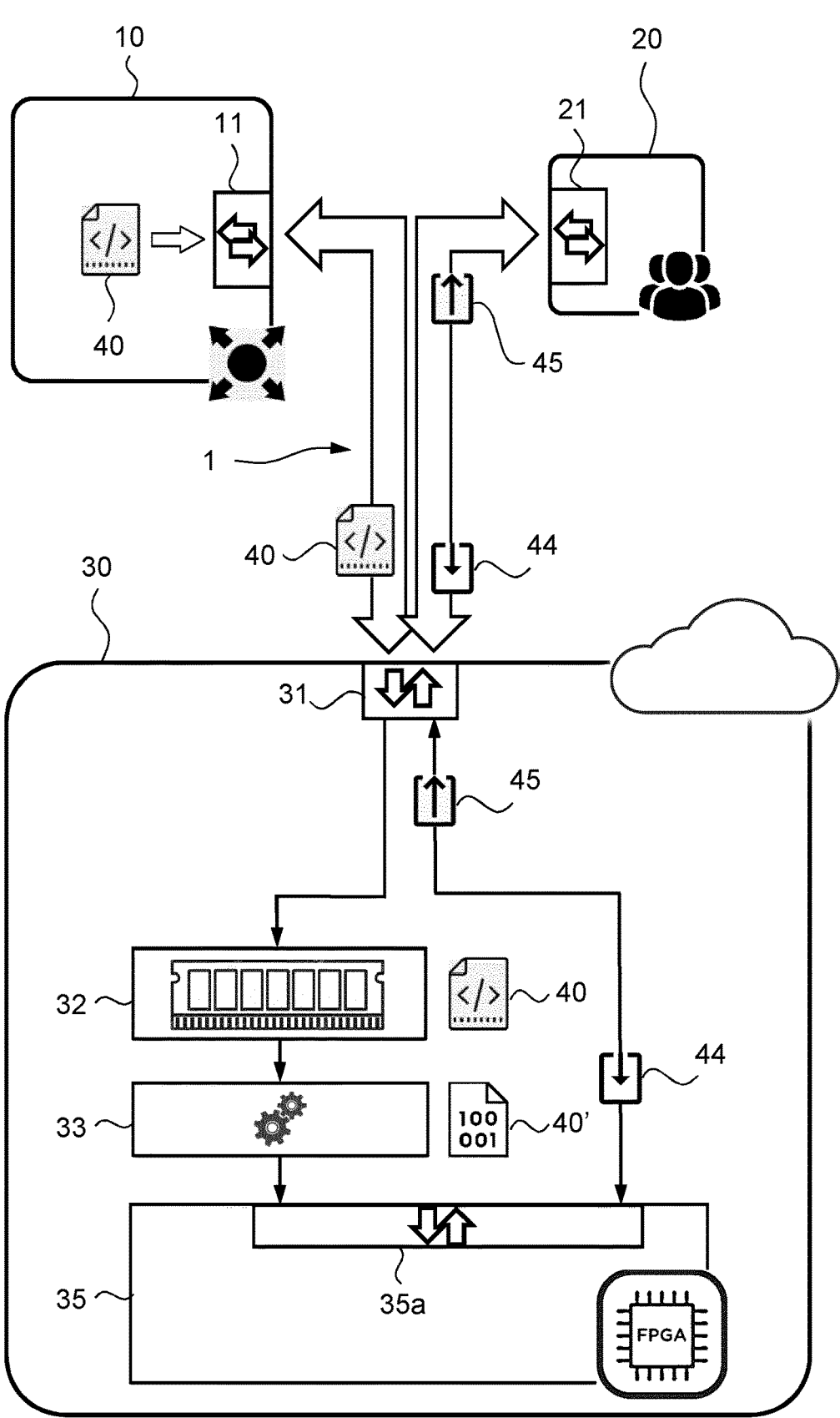
FIG. 1 is an example of a typical environment in which the present method may be implemented.

FIG. 1 shows a schematic overview of an environment comprising three main entities, namely a provider 10, a user unit 20 and a platform 30 comprising at least a programmable device 35. These entities may be connected each other through a network, typically an untrusted network such as the Internet. Nevertheless, a local area network (LAN) such as a private network, may be also used instead of a wide area network (WAN) or in addition to a WAN. Preferably, the provider 10 and the user unit 20 are both remotely connected to the platform 30, so that the platform 30 may be regarded as being located within a cloud. It should be noted that it is not necessary for the user unit 20 to be connected to the provider 10, e.g. for exchanging data or messages, in order to understand the principle of the present solution. Accordingly, there is no direct connection or link shown in FIG. 1 between the provider 10 and the user 20, although this may be the case in reality.

The provider 10 is preferably located within a secure area. The provider is typically designed to provide program codes 40, especially program codes intended for the programmable device 35 which is physically located in the platform 30. Such program codes 40 are also referred as to "netlists" by the person skilled in the art. A so-called netlist may be regarded as a set of source data presented in the form of a code for programming device that, once programmed, will have at least one desired function or application. The code may be a high-level software language and the program code 40 may be stored in a so-called source file. The program code may typically relate to a computer program or to an instruction code corresponding to a software program that includes instructions to be executed by a processor in different sequences to run the program.

The user unit 20 may be regarded as being any kind of device requiring the services of the platform 30, especially the services of the programmable device 35. Accordingly, if the programmable device 35 is for example programmed with an application configured to perform tasks and/or to provide certain services or results, the user unit 20 can be regarded as being a device, such as a client unit, which may need for receiving such services or results. For this reason, there is preferably a bi-directional connection that may be established between the user unit 20 and the platform 30, as schematically shown in FIG. 1. Although a single user unit 20 is part of the environment depicted in FIG. 1, it should be understood that several user units 20 may be connected to the platform 30 for benefiting the services of the programmable device 35.

As schematically shown in FIG. 1, the programmable device 35 is therefore located remotely from the provider 10 and preferably at distance from the user unit 20. The platform 30 hosting the programmable device 35 may be untrusted platform. The programmable device 35 is an electronic device such as an electronic circuit, e.g. built on a printed circuit board, onto which at least one program code 40 can be loaded in order to provide the programmable device with at least one certain feature or functionality. Such a functionality could be designed to process an input 44, so as to provide in return an expected result as an output 45. The input 44 may be an input signal to be decoded, input data or messages to be processed or merely a request. The output 45 may be used as response transmitted back to the user unit 20. Still preferably and as shown in FIGS. 1 and 2, the programmable device 35 is a reprogrammable hardware element such as a so-called Field Programmable Gate Array (FPGA).

Each entity 10, 20, 30 comprises a communication interface 11, 21, 31 for exchanging data through at least one communication channel 1 which may be part of a network, such as the Internet. FIG. 1 typically represents a conventional architecture in which the provider 10 is in charge of generating a program code 40 to be loaded in the programmable device 35. The program code 40 is sent, via the communication channel 1, to the remote platform 30. Once received by the platform 30, the program code 40 is typically stored in a storage device 32 before being converted, by a converting tool 33 such as a compiler, to a format understandable by the programmable device 35. Once converted in such a format, the converted program code 40' is transmitted to the programmable device 35, via its communication interface 35a, in order to be loaded therein. Once loaded, the programmable device 35 acquires a certain functionality for processing data sent as input 44 by the user unit 20, and sending back a response or a result as output 45 of the programmable device.

However, such a scheme has several points of weakness. Indeed, the program code 40 could be hacked at various locations between the provider 10 and the programmable device 35, especially due to the fact that the platform 30, onto which the programmable device is located, may be an unsecured or untrusted entity, or even a shared platform in the cloud for instance. The first point of attack is located between the provider 10 and the platform 30, namely within the communication channel 1 or within the wide area network. During this transfer, a malicious person may intercept, copy, modify or steal the program code 40 without anyone noticing. The second and third points of attack are located within the storage device 32 and within the converting tool 33 which may be other entry points for a hacker. The fourth point of attack could be located in the connection linking the converting tool 33 to the programmable device 35. The last point of attack could be located in the programmable device 35, for example in a memory designed to store the converted program code 40' within the programmable device 35.

Figure 2:
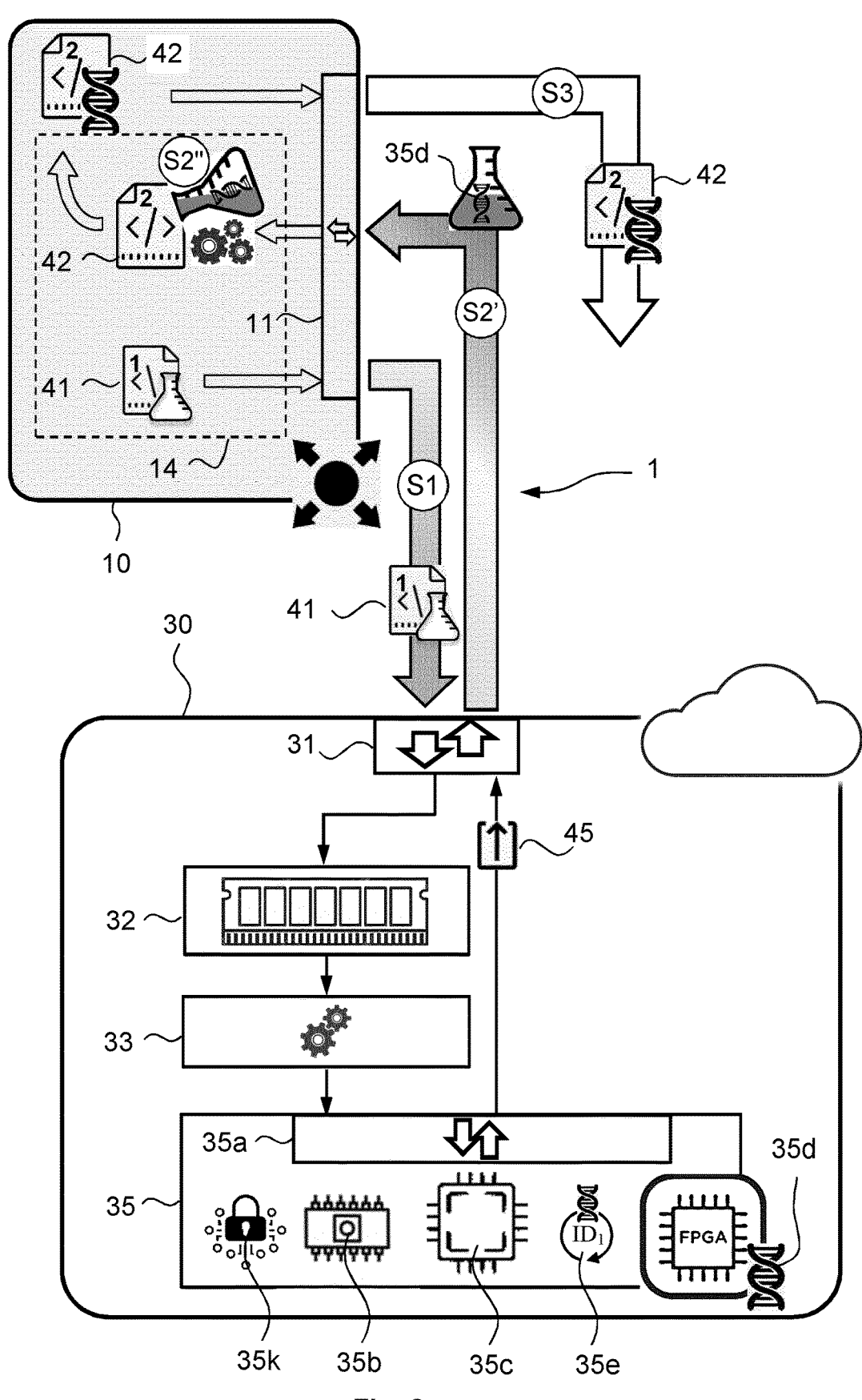
FIG. 2 depicts a flowchart of the method of the present solution, together with the main entities involved in this method.

To overcome such a drawback, the present solution discloses a method that is mainly depicted in FIG. 2. This method is configured to remotely programming the programmable device 35 which is designed to provide an expected sensitive result 45. Such a result is defined as being sensitive as it could be subject to attacks, as presented above. The sensitive result 45 may be any type of data provided by the programmable device 35. For example, the sensitive result may be a business value or a cryptographic key.

The first step S1 of the method aims to transmit a first program code 41 to the programmable device 35. This first program code 41 may be regarded as being a characterization netlist or a setting netlist. Accordingly, the first program code 41 should not be confused with the program code 40 shown in FIG. 1. Indeed, the program code 40 is a functional program code that is directly usable to provide a sensitive expected result 45 once loaded on a device such as the programmable device 35. On the other hand, the first program code 41 is unable to provide such an expected result 45 because it is not designed for that purpose. Indeed, the first program code 41 is configured to get at least one distinctive data 35d unique and physically inherent to the programmable device 35. In FIG. 2, this distinctive data 35d is schematically depicted by a DNA portion of the programmable device and the first program code 41 is schematically stamped with a vial to collect such a DNA portion.

Such a distinctive data may be derived from an oscillator, e.g. a ring oscillator 35e having a specific frequency which is not exactly identical to the frequency of another ring oscillator of the same type. This is true even if both the two oscillators have been produced according to the same manufacturing process by a single production line. Indeed, each oscillator has an intrinsic frequency essentially resulting from small variations to which it has been submitted during manufacture. These minor variations result from the manufacturing process tolerances and make the oscillator unique thanks to their intrinsic properties. The same applies for other electronic components or circuits, so that there is no requirement to extract distinctive data 35d from oscillators only; other electronic components may be used. Getting the distinctive data 35 from an electronic component may be carried out by measuring thereon one or several physical quantities. To this end, a sharp measuring device and/or process may be applied. Furthermore, it should be noted that other technologies may be used to create physically unclonable functions, such as technologies based on Magnetoresistive Random Access Memory (MRAM) or Static Random Access Memory (SRAM), both relying on memory behavior.

The second step (S2' and S2") of the method aims firstly to retrieve the distinctive data 35d in order to generate a second program code 42. In FIG. 2, this operation S2' is schematically depicted by the sampling of the vial containing the DNA portion of the programmable device 35. Retrieving such a data may be achieved by receiving the distinctive data 35d from the platform 30, e.g. from the programmable device 35 or form any other device of the platform configured to get the distinctive data 35d of the programmable device. To this end, the latter may be configured, e.g. thanks to the first program code 41, to transmit its distinctive data 35d to the provider 10. Preferably, such a transmission may be performed as soon as the distinctive data 35d of the programmable device 35 has been obtained. This transmission may be secured, for example by applying a cryptographic process, and preferably as well as an authentication process, onto the distinctive data 35d before its transmission to the provider 10. The cryptographic process may refer to any kind of encryption algorithm, and the authentication process may be typically based on a digital signature scheme.

Once retrieved e.g. by the provider 10, the latter is able to generate the second program code 42 during an operation, denoted S2", which is schematically illustrated in FIG. 2 by the use of the DNA collected by the vial to generate the second program code 42. This operation may be regarded as the second part of the second step.

The second program code 42 is a program code configured to provide the expected sensitive result 45 in case it is executed on the programmable device 35 having produced the distinctive data 35*d*. In other words, if the second program code 42 is run on a device different from the programmable device 35 from which the distinctive data 35*d* have been obtained, the result provided by the second program code 42 will be different from the expected sensitive result 45. This is due to the fact that the second program code 42 has been configured in accordance with a portion of the "DNA" of the programmable device 35, more specifically in accordance with the distinctive data 35*d* unique and physically inherent to a specific programmable device 35. Accordingly, only the single and unique programmable device 35 from which the distinctive data 35*d* has been extracted will be able to provide the expected sensitive result 45 if the second program code 42 is loaded in this programmable device 35. It should be further noted that sensitive result is defined as an expected sensitive result 45 if it is correct. If the second program code 42 is loaded and run on a third device, i.e. on a device different from the programmable device 35 having produced the distinctive data 35*d*, the sensitive result provided by this third device will be incorrect. This means that the second program code 42 may be worked on a third device, i.e. without necessarily causing a system error, but the result provided by this third device will be different from the expected sensitive result 45.

The third step S3 of the method aims to transmit the second program code 42 to the programmable device 35, so as to load the second program code 42 into the programmable device.

Thanks to the present method, there is no longer efficient attack points, typically between the provider 10 and the programmable device 35, given that the first program code 41 is unable to provide the expected sensitive result 45 as it not designed for such a purpose, and the second program 42 is only able to provide the expected sensitive result 45 when it is executed on the programmable device 35 having produced the distinctive data 35*d*. Furthermore, it should be noted that the expected sensitive result 45 is usually a response provided by the programmable device 35 to an input 44. It means that the expected sensitive result 45 may depend not only from the distinctive data 35*d* but also from the input 44. Given that the distinctive data 35*d* is physically bound to the programmable device 35 for computing the expected sensitive result 45, there is no possibility for a hacker to remotely get such a distinctive data 35*d* which may be regarded as being closer to hardware than software. Accordingly, obtaining the distinctive data 35*d* of the programmable device would require a hardware attack rather than a software attack.

However, any hardware attack is considered to be excluded, since it would require the hacker to physically go to the site where the programmable device 35 is located. According to one embodiment, the first program code 41 and the second program code 42 are designed by a provider 10 remotely linked to the programmable device 35 via the communication channel 1. The provider 10 is preferably a secure provider, namely a provider located within a secure area. Accordingly, generating the first and second program codes 41, 42 may be securely achieved within a trusted environment, preferably by a program code generator 14 which may be located within the provider 10. The communication channel 1 between the provider 10 and the programmable device 35, or the platform 30, does not need to be a secure channel and may be a channel within any network, such as the Internet. Generally speaking, the communication channel 1 is at least partly provided by a global network (e.g. the Internet) or by an untrusted communication channel. Nevertheless, if the communication channel 1 is an untrusted channel, the first program code is preferably transmitted to the programmable device in a secure manner so as to ensure its authenticity and its integrity. To this end, the first program code 41 may be transmitted in an encrypted form together with a digital signature to ensure that no changes have been made to the first program code during its transmission between the provider 10 and the programmable device 35.

In a preferred embodiment, the distinctive data 35*d* results or is derived from a physically unclonable function (PUF) applied to at least one component 35*e* of the programmable device 35. PUF functions aim to exploit manufacturing process variation of electronic components, such as the component 35*e*, which make the electronic circuit of the programmable device 35 unique thanks to the intrinsic properties of these electronic components. Although a ring oscillator 35*e* has been used as example in the illustration of FIG. 2, it should be noted that there is no requirement to limit PUF functions to ring oscillators. The PUF function may be a function that is part of the first program code 41 or a function that is part of the programmable device 35, or another suitable device, and which may be triggered by the first program code 41 for instance.

In one embodiment, the second program code 42 is parameterized and/or altered in accordance with the distinctive data 35*d*. For example, the second program code 42 may be a program code which has been transformed by an invertible function depending on the distinctive data 35*d*. In other words, the second program code 42 may have undergone a transformation undertaken by an invertible function which depends on the distinctive data 35*d*. Preferably, the invertible function is a mathematical or a logical function such as an XOR function for example.

In one embodiment, the second program code 42 is transformed by replacing at least one program code portion by an altered portion. In this case, the aforementioned program code portion which has been replaced would remain retrievable using the distinctive data 35*d*. For example, the program code portion may be transformed by an invertible function, more specifically by a bijective invertible function (e.g. an encryption function) parametrized by the distinctive data 35*d*.

Figure 3:
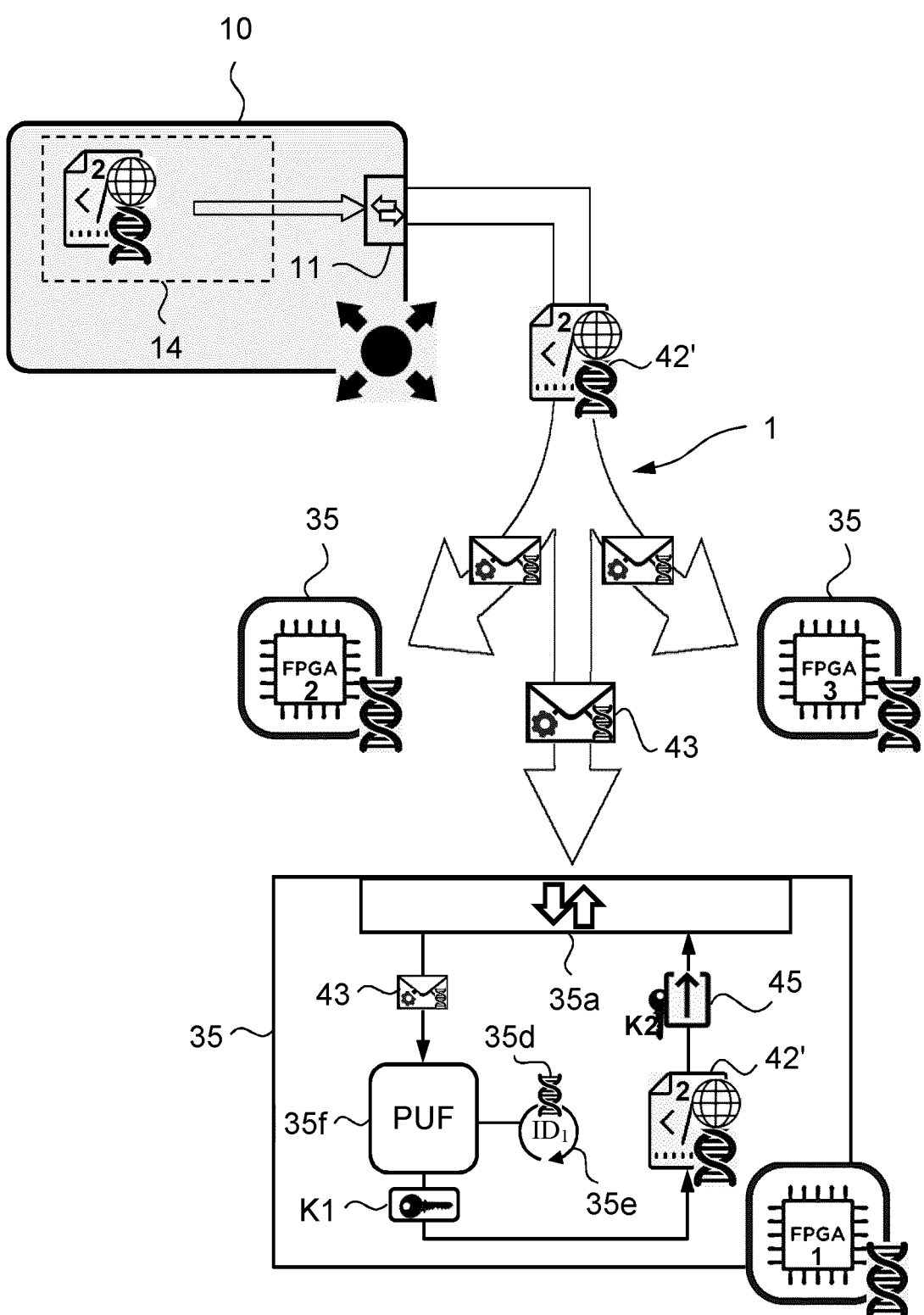
FIG. 3 depicts a variant of the method shown in FIG. 2.

According to another embodiment schematically shown in FIG. 3, the second program code 42 is a global program code 42' common to a set of distinguishable programmable devices 35. In other words, a single global program code 42' is intended or configured to be used by a plurality of programmable devices 35. Accordingly, this embodiment may be regarded as being more cost-effective. In addition this embodiment is easier to implement given that there is no need to generate a second program code 42 for each programmable device 35 in case where a plurality of such devices is to be considered. Accordingly, the global program code 42' may be regarded as a generic second program code 42 that may then be personalized, e.g. by sending a personal setting message 43 to the programmable device 35, i.e. to each programmable device in case where a plurality of such devices is to be considered, or to at least one programmable device 35 among a plurality of programmable devices 35.

The personal setting message 43 should be based on the distinctive data 35*d* of the related programmable device 35. For example, the personal setting message 43 may be a value which, taken in combination with a PUF value (i.e. a value provided by a PUF function applied to the programmable device), may provide the content of a variable included in the global program code. Accordingly, even the second program code is global and therefore common to a plurality of programmable devices 35, the expected sensitive result 45 provided as output may be specific and unique for each programmable device 35.

Advantageously, generating personal setting messages require less computer resources than generating second program codes 42 for each programmable device 35. In addition, such an embodiment is also more flexible since it allows to easy add further programmable devices 35 at a later stage, without needing to adapt or modify the second program code. Indeed, the distinctive data 35d of any newly added programmable device 35 may be still collected by using the first program code 41. Then, the personal setting message 43, generated e.g. by the provider 10, may be sent to the programmable device 35 in order to remotely personalize the global program code 42' at the programmable device 35, preferably to remotely personalize the expected sensitive result 45 provided by the global program code 42'.

For example, in the event that the programmable device 35 is able to provide a specific data, such as a unique key K2, as an expected sensitive result 45, therefore this programmable device should receive a personal setting message 43, namely a unique message that is specific to the programmable device 35 and configured for setting purposes. More specifically, the personal setting message 43 would be configured to parametrize or set the global program code 42', so that the programmable device 35 provide the appropriate data (e.g. the aforementioned unique key K2) as expected sensitive result 45. Setting the global program code 42' may be achieved e.g. by providing a specific data to at least one function or to at least one variable of the global program code.

According to another embodiment, the programmable device 35, for which the global program code 42' and the related personal setting message 43 have been sent, comprises a unique function 35f. This unique function 35f may be configured to provide a first key K1 from the personal setting message 43 used as input data in this unique function, as depicted in FIG. 3. This first key K1 may be further used as input of the global program code 42' for providing therefrom the expected sensitive result 45.

According to one embodiment, the global program code 42' is a cryptographic algorithm, for example a standardized cryptographic algorithm such as AES or similar. In this embodiment, the first key K1 may be used as input of such a standardized algorithm. Even if the general operation of an algorithm such as AES is well known by hackers, this is not an issue given that the key (i.e. the first key K1) injected in this algorithm remains secret and uniquely bound to the related programmable device 35.

According to another embodiment, the expected sensitive result 45 is a second key K2, preferably an activation key or a cryptographic key. Such a second key may then be used e.g. by the user unit 20 for any purpose.

In one embodiment, at least one of the transmitting and receiving steps is secured by at least one of an authentication process and an encryption process. For example, the expected sensitive result 45 may be encrypted by the programmable device 35, or by any other suitable device of the platform 30, before being sent to the user unit 20. As another example, the distinctive data 35d provided by the first program code 41 may be transmitted to the provider 10 in an encrypted form during the operation S2' of the second step of the method. Similarly, the personal setting message 43 received by at least one of the programmable device 35 may be also protected by an encryption mechanism. In addition, if the algorithm used for example in the second program code 42 is a digital asset, typically an algorithm having specific properties such as a proprietary algorithm which should be kept secret (in contrast to a standardized algorithm), the second program code 42 may be transmitted to the programmable device 35 in an encrypted form. Accordingly, the platform 30, preferably the programmable device 35 or an associated device, may comprise a cryptographic module 35k (FIG. 2) configured for undertaken a cryptographic process, e.g. encryption and/or decryption operations, and an authentication process if any.

In one embodiment, at least one of the first program code 41 and the second program code 42 is a netlist, a source code or a machine code.

According to a second aspect, the present solution also relates to a programmable device 35 designed to be remotely programmed according to the above-described method, more specifically according to any embodiment of this method or to any possible combination of embodiments of this method. The programmable device is thus programmed in order to provide an expected result 45. As shown in FIG. 2, the programmable device 35 comprises:

at least one distinctive data 35d unique and physically inherent to the programmable device,
  a communication interface 35a for receiving:
    a first program code 41, configured to get the aforementioned distinctive data 35d, and
    a second program code 42, configured to provide the expected sensitive result 45 on the basis of said distinctive data 35d,
  at least one memory 35b for storing said first and second program codes 41, 42, and
  a processor 35c or a hardware state machine for executing said first and second program codes 41, 42.

The programmable device 35 preferably comprises a unique function 35f such as the PUF function for example. The distinctive data 35d may be derived from at least one component of the programmable device 35 such as an oscillator 35e, more specifically a ring oscillator. The unique function 35f may be processed by the processor 35c and, if any, may be stored in the processor itself or in the memory 35b. Alternatively, the unique function 35f may be processed within the fabric of the programmable device 35, e.g. by some custom logic, and stored within the programmable device structure. Depending on the embodiment of the aforementioned method, the programmable device 35 may further comprise a cryptographic module 35, as well as other modules or units configured for performing other specific tasks. Preferably, the programmable device 35 is a so-called FPGA.

In a third aspect, the present solution relates to a provider 10 for remotely providing program codes 41, 42 to a programmable device 35, in particular to at least one programmable device 35, according to the above-described method, more specifically according to any embodiment of this method or to any possible combination of embodiments of this method. This provider 10 comprises:

a program code generator 14 for generating:
    a first program code 41, configured to get at least one distinctive data 35d unique and physically inherent to the programmable device 35, and
    a second program code 42, configured to provide an expected sensitive result 45 on the basis of said distinctive data 35d, and
  a communication interface 11 configured to be connected to a communication channel 1 for sending said first and second program codes 41, 42 to the programmable device 35 and for receiving therefrom said distinctive data 35*d*. Depending on the embodiment of the aforementioned method, the provider 10 may further comprise a cryptographic module (not shown), so as to perform similar tasks as those for which the cryptographic module 35*k* of the programmable device 35 may be intended for.

It should be noted that any feature or combination of features disclosed in connection with the method may be also part of at least one of the programmable device 35 and the provider 10 if applicable.

FINAL CONSIDERATIONS

Although an overview of the inventive subject matter has been described with reference to specific example embodiments, various modifications and changes may be made to these embodiments without departing from the broader spirit and scope of embodiments of the present invention. For example, various embodiments of features thereof may be mixed and matched or made optional by a person of ordinary skill in the art. Therefore, the Detailed Description is not to be taken in a limiting sense, and the scope of various embodiments is defined only by the appended claims, along with the full range of equivalents to which such claims are entitled.

The invention claimed is:

1. A method for remotely programming a programmable device designed to provide an expected sensitive result, the method comprising:

transmitting a first program code to the programmable device, the first program code being configured to obtain distinctive data unique and physically inherent to the programmable device, the distinctive data obtained by the first program code detecting physical characteristics of circuitry of the programmable device which result in unique and physically inherent data;

retrieving the distinctive data; and transmitting a second program code configured based on the retrieved distinctive data to the programmable device, to load the second program code into the programmable device, wherein the second program code is transformed by an invertible function depending on the distinctive data, the invertible function being a calculated function or a logical function and the second program code is a global program code configured to be personalized by way of a personal setting message, the personal setting message being based on the distinctive data of the programmable device.

2. The method of claim 1, wherein the first program code and the second program code are designed by a provider remotely linked to the programmable device via a communication channel.

3. The method of claim 2, wherein in the event that the communication channel is at least partly provided by an untrusted communication channel, the first program code is transmitted to the programmable device in a secure manner so as to ensure authenticity and integrity of the first program code.

4. The method of claim 1, wherein the distinctive data results or is derived from a physically unclonable function applied to at least one component of the programmable device.

5. The method of claim 1, wherein the second program code is transformed by an invertible function depending on the distinctive data.

6. The method of claim 5, wherein the invertible function is a mathematical function.

7. The method of claim 5, wherein the second program code is transformed by replacing at least one program code portion, retrievable from the distinctive data, by an altered portion.

8. The method of claim 1, wherein the second program code is a global program code, common to a set of distinguishable programmable devices, configured to be personalized by means of a personal setting message for at least one programmable device of the set of distinguishable programmable devices, the personal setting message being based on distinctive data of the at least one programmable device.

9. The method of claim 8, wherein the at least one programmable device comprises a unique function configured to provide a first key from the personal setting message used as input data in the unique function, the first key being further used as input of the global program code for providing therefrom the expected sensitive result.

10. The method of claim 8, wherein the global program code is a cryptographic algorithm.

11. The method of claim 1, wherein the expected sensitive result is a second key, the second key being an activation key or a cryptographic key.

12. The method of claim 1, wherein at least one of the transmitting or the retrieving is secured by at least one of an authentication process and an encryption process.

13. The method of claim 1, wherein at least one of the first program code and the second program code is a netlist, a source code or a machine code.

14. The method of claim 1, wherein the second program code is configured externally from the programmable device before transmitting of the second program code to the programmable device.

15. The method of claim 1, wherein the second program code is transformed by an invertible function depending on the distinctive data, the invertible function being a logical function.

16. The method of claim 1, wherein the second program code is transformed by an invertible function depending on the distinctive data, the invertible function being a calculated function.

17. A programmable device designed to be remotely programmed in order to provide an expected sensitive result, the programmable device comprising:

distinctive data unique and physically inherent to the programmable device;

a communication interface configured to receive a first program code, configured to obtain the distinctive data, and a second program code, configured based on the distinctive data, the distinctive data obtained by the first program code detecting physical characteristics of circuitry of the programmable device which result in unique and physically inherent data;

at least one memory for storing the first and second program codes; and a processor or a hardware state machine configured to execute the first and second program codes, wherein the second program code is transformed by an invertible function depending on the distinctive data, the invertible function being a calculated function or a logical function and the second program code is a global program code configured to be personalized by way of a personal setting message, the personal setting message being based on the distinctive data of the programmable device.

18. A provider for remotely providing program codes to at least one programmable device, the provider comprising:
    a program code generator configured to generate a first program code and configured to obtain at least one distinctive data unique and physically inherent to the at least one programmable device, and a second program code, configured based on the at least one distinctive data, the at least one distinctive data obtained by the first program code detecting physical characteristics of circuitry of the at least one programmable device which result in unique and physically inherent data; and
    a communication interface configured to be connected to a communication channel, to send the first and second program codes to the at least one programmable device and, and to receive therefrom the at least one distinctive data,
    wherein the second program code is transformed by an invertible function depending on the at least one distinctive data, the invertible function being a calculated function or a logical function and the second program code is a global program code configured to be personalized by way of a personal setting message, the personal setting message being based on the at least one distinctive data of the at least one programmable device.

* * * * *